United States Patent
Ohyama

(10) Patent No.: US 7,348,529 B2
(45) Date of Patent: Mar. 25, 2008

(54) OPTICAL DEVICE AND OPTICAL PICKUP DEVICE

(75) Inventor: Minoru Ohyama, Kanagawa-ken (JP)

(73) Assignee: Victor Company of Japan, Limited, Yokohama-shi, Kanagawa-ken (JP)

(*) Notice: Subject to any disclaimer, the term of this patent is extended or adjusted under 35 U.S.C. 154(b) by 69 days.

(21) Appl. No.: 10/587,210

(22) PCT Filed: Jan. 11, 2005

(86) PCT No.: PCT/JP2005/000173

§ 371 (c)(1),
(2), (4) Date: Jul. 25, 2006

(87) PCT Pub. No.: WO2005/071672

PCT Pub. Date: Aug. 4, 2005

(65) Prior Publication Data

US 2007/0115520 A1    May 24, 2007

(30) Foreign Application Priority Data

Jan. 26, 2004  (JP)  ............................ P2004-016988

(51) Int. Cl.
*G11B 7/00* (2006.01)
(52) U.S. Cl. .............................. 250/201.5; 250/237 G; 369/44.12; 369/112.04; 369/112.1
(58) Field of Classification Search ............ 250/201.2, 250/201.4, 201.5, 237 G, 550; 369/44.12, 369/44.14, 44.23, 44.41, 112.03, 112.04, 369/112.1

See application file for complete search history.

(56) References Cited

U.S. PATENT DOCUMENTS

| 2007/0081431 A1* | 4/2007 | Watanabe et al. ......... 369/44.12 |
| 2007/0188835 A1* | 8/2007 | Ohyama ......................... 359/1 |

FOREIGN PATENT DOCUMENTS

| JP | 08-017069 | 1/1996 |
| JP | 09-274730 | 10/1997 |
| JP | 2001-202647 | 7/2001 |
| JP | 2002-092902 | 3/2002 |
| JP | 2002-109759 | 4/2002 |
| JP | 2002-123967 | 4/2002 |
| JP | 2002-260273 | 9/2002 |
| JP | 2003-151169 | 5/2003 |

* cited by examiner

*Primary Examiner*—Kevin Pyo
(74) *Attorney, Agent, or Firm*—The Nath Law Group; Jerald L. Meyer; Stanley N. Protigal

(57) ABSTRACT

An optical device diffracts incident light with a hologram element 19 and receives the diffracted light with light receiving regions 20A to 29 on a light receiving element 12. The light receiving element 12 separately receives reflected main beams used to read information from an optical disc and reflected sub-beams used for a tracking operation with different ones of the light receiving regions. The light receiving regions to receive the reflected main beams are common irrespective of the wavelengths of the reflected main beams. The light receiving regions to receive the reflected sub-beams are different depending on the wavelengths of the reflected sub-beams. The optical device can record and/or reproduce information signals to and/or from optical discs, which need light sources of different wavelengths, without the influence of unnecessary reflected light from the optical discs or without complicating operation of output signals.

9 Claims, 8 Drawing Sheets

FIG. 8
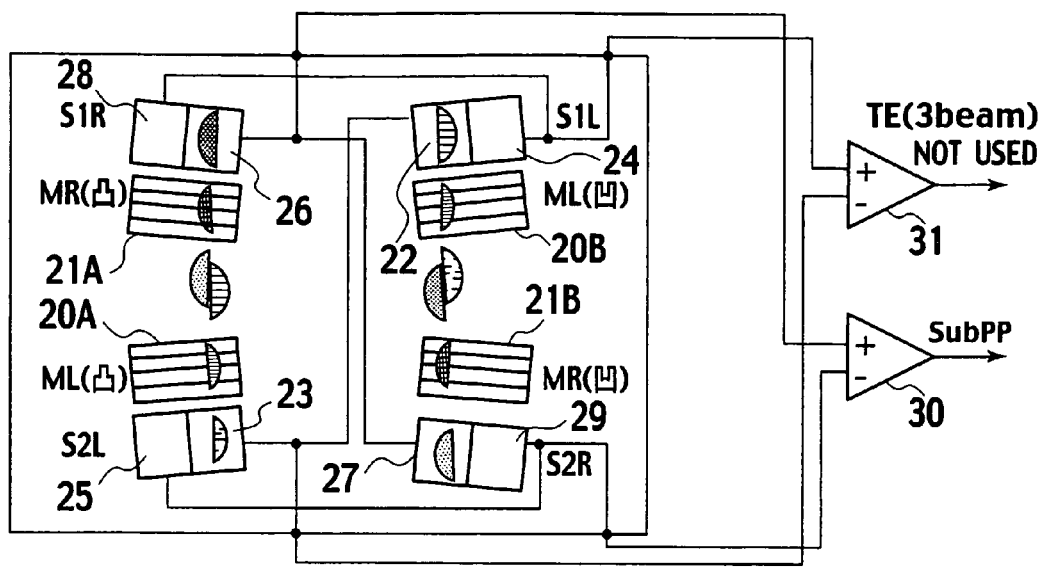
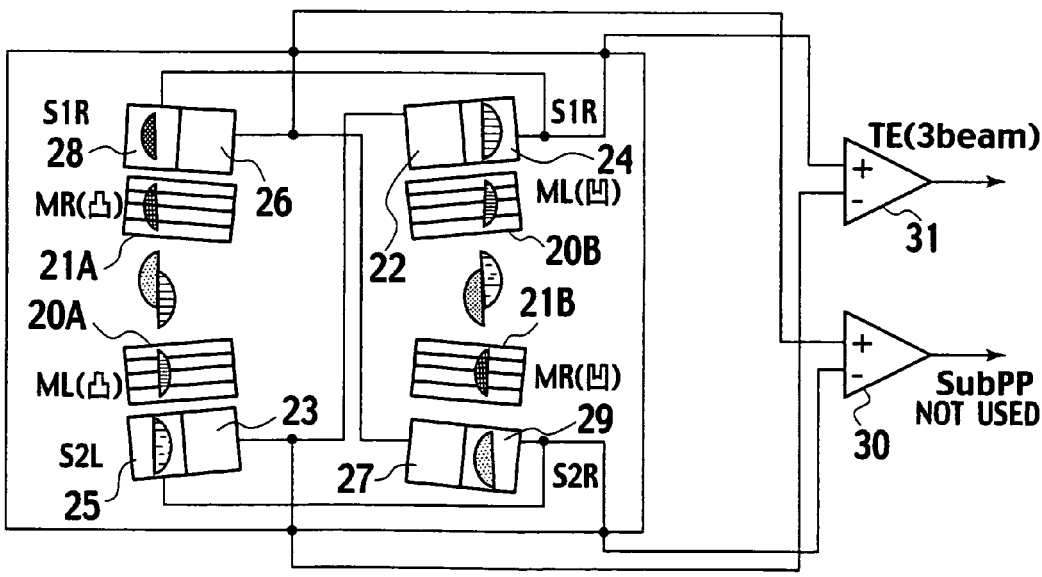

OPTICAL DEVICE AND OPTICAL PICKUP DEVICE

TECHNICAL FIELD

The present invention relates to an optical device used for an optical pickup apparatus for recording and reproducing information to and from an information recording medium such as an optical disc, as well as to an optical pickup apparatus employing such an optical device.

BACKGROUND TECHNOLOGY

Various optical discs serving as information recording media have been proposed. Among the optical discs, optical discs of DVD (Digital Versatile Disc) standard whose recording capacity is about seven times as large as optical discs of CD (Compact Disc) standard have rapidly spread in recent years. DVD-Video discs that contain video signals recorded on DVD discs are mass-producible through duplication, and therefore, are widely used as distribution and rental media in place of VHS (registered trade name) video tapes and the like.

Other optical disc standards such as DVD-RAM, DVD-R, DVD-RW, +R, and +RW standards that allow users to record information signals are also rapidly spreading for media used with personal computers (PCs) and video recorders.

For CD-standard optical discs, there are popular standards such as CD-R that allow users to record information signals on the discs.

Optical disc recorders are required to have a function of recording information signals on DVD-standard optical discs with a light source of 650-nm band, as well as on CD-standard optical discs with a light source of 780-nm band. As mentioned above, there are a variety of standards for DVD-standard optical discs, and there is a need to cope with these standards in writing and reading the discs. To meet the need, several optical pickup apparatuses have been proposed.

Optical pickup apparatuses capable of recording and reproducing data to and from optical discs of various standards have complicated functions and structures, and therefore, are difficult to manufacture. For such optical pickup apparatuses, in particular, for consumer optical pickup apparatuses, there are increasing requirements of performing multiple functions, simplifying structures, reducing size and weight, minimizing manufacturing processes, and lowering costs.

To meet the requirements, various optical pickup apparatuses that are compact, light weight, and capable of reproducing or recording/reproducing CD- and DVD-standard optical discs have been proposed.

An example of one of such optical pickup apparatuses is shown in FIG. 1. This apparatus has been proposed by the inventor of the present invention. In FIG. 1, the optical pickup apparatus has a first laser source 101 to emit laser light of first wavelength and an optical device 102 that incorporates a second laser source to emit laser light of second wavelength. In FIG. 2, the optical device 102 integrally has the second laser source 103, a hologram element 104, and a light receiving element 105. In FIG. 3, the light receiving element 105 has light receiving parts 106 each divided into a plurality of light receiving regions.

In the optical pickup apparatus, laser light of each wavelength produces three beams, which are emitted to a recording track 201a on an optical disc 201. Reflected beams from the optical disc 201 are diffracted by two divided regions of the hologram element 104 as shown in FIG. 2 and are received by predetermined ones of the light receiving regions of the light receiving element 105. At this time, reflected beams of the first and second wavelengths are received by the same light receiving regions.

In the optical pickup apparatus, the light receiving regions of the light receiving element 105 separately provide light detected outputs from which information signals and error signals related to the optical disc are obtained.

The related art is disclosed in a patent document of Japanese Unexamined Patent Application Publication No. 2002-260273.

DISCLOSURE OF THE INVENTION

Problems of the above-mentioned optical pickup apparatus will be explained.

When reproducing a CD-standard optical disc, a so-called "three-beam method" is usually employed to detect a tracking error signal. When recording a DVD-standard optical disc, a so-called DPP (differential push-pull) method is generally used to detect a tracking error signal. Each method uses three beams divided from light of a laser source, employs a different beam dividing technique, and carries out a different operation on an output from a light receiving element. Accordingly, an optical device in an optical pickup apparatus must employ complicated techniques to provide detection outputs and process the detection outputs.

An objective lens used for both the CD- and DVD-standard optical discs condenses laser light on an optical disc. The condensed laser light includes a component condensed to a spot as well as a flare component caused by diffraction of the objective lens. The flare component is reflected by the optical disc and widely irradiates the light receiving element. The reflected flare component is detected as a DC component added to information and error signals from the optical disc, to deteriorate signal modulation levels and cause an offset in the error signal.

When reproducing a DVD-standard optical disc having two recording layers, laser light emitted to the optical disc is reflected by a first recording layer which is a reproducing object as well as by a second recording layer. The reflected light from the second recording layer is returned as unnecessary reflected light to the light receiving element. The reflected light from the recording layer that is not a reproducing object is greatly defocused and widened on the light receiving element and has light quantity equivalent to that of reflected light from the objective recording layer. The unnecessary reflected light is detected as a DC component added to information and error signals from the optical disc, to deteriorate signal modulation levels and cause an offset in the error signal.

An optical pickup apparatus for recording information signals on an optical disc must generate three beams if the apparatus is based on one of the three-beam method and DPP method. At this time, the apparatus secures recording light power by increasing the light quantity ratio of a main beam to sub-beams to, for example, 15:1 up to 20:1. Adjacent light receiving regions to receive reflection of the three beams have a risk that diffused light of the reflected main beam may spread over the light receiving regions that must receive the reflected sub-beams. Since the light quantity of the main beam is about 15 to 20 times larger than that of the sub-beams, the light quantity of the diffused light of the reflected main beam gives an unignorable influence on the light receiving regions that must receive the reflected weak sub-beams. The diffused light of the reflected main beam is detected as a DC component added to information and error signals from the optical disc, to deteriorate signal modulation levels, cause an offset in the error signal, and degrade the dynamic range of an operation circuit.

The above-mentioned optical device employs the same hologram element to diffract reflected beams having different wavelengths including a wavelength for a CD-standard optical disc and a wavelength for a DVD-standard optical disc. Due to the wavelength dependence of a diffraction angle, the reflected beams reach different positions on the light receiving element. To receive reflected beams having different wavelengths with the same light receiving region, each light receiving region of the light receiving element must have a large area. Enlarging the area of each light receiving region, however, results in proportionally increasing the quantity of unnecessary reflected light, to thereby deteriorate signal modulation levels, cause an offset in an error signal, and degrade the dynamic range of an operation circuit.

The light receiving region may be divided according to positions where the reflected beams of different wavelengths reach. This, however, results in increasing the number of signal output channels from the divided parts, enlarging the size of the operation circuit, increasing the number of wiring pins of the optical device, and expanding the size of the optical device.

In consideration of these situations, an object of the present invention is to provide an optical device capable of reproducing or recording/reproducing information signals to and from DVD- and CD-standard optical discs that need light sources of different wavelengths, avoiding an influence of unnecessary reflected light from an optical disc, and simplifying operation to be carried out on output signals. Also provided is an optical pickup apparatus employing such an optical device.

In order to accomplish the objects, the present invention provides an optical device having at least a light receiving element and a hologram element. The hologram element diffracts a plurality of incident beams having different wavelengths. The light receiving element has light receiving regions to receive the diffracted beams. The light receiving element has light receiving regions to separately receive reflected main beams to be used to detect information from an information recording medium and reflected sub-beams to be used for a tracking operation. The reflected main beams of different wavelengths are commonly received by those of the light receiving regions that are configured to receive the reflected main beams. The reflected sub-beams of different wavelengths are separately received depending on the wavelengths by those of the light receiving regions that are configured to receive the reflected sub-beams.

The optical device separately receives reflected sub-beams with different ones of the light receiving regions depending on the wavelengths of the reflected sub-beams. This prevents a deterioration of signal modulation level and an offset of an error signal and secures a dynamic range for an operation circuit.

The present invention also provides an optical device having at least a light receiving element and a hologram element. The hologram element diffracts a plurality of incident beams having different wavelengths. The light receiving element has light receiving regions to receive the diffracted beams. The light receiving element has light receiving regions to separately receive reflected main beams to be used to detect information from an information recording medium and reflected sub-beams to be used for a tracking operation. The reflected main beams of different wavelengths are separately received depending on the wavelengths by those of the light receiving regions that are configured to receive the reflected main beams. Detection outputs from the light receiving regions for the main beams are combined into a common output. The reflected sub-beams of different wavelengths are separately received depending on the wavelengths by adjacent ones of the light receiving regions that are configured to receive the reflected sub-beams. Detection outputs from the adjacent light receiving regions for the reflected sub-beams are separated from one another.

The optical device receives reflected main beams with different ones of the light receiving regions depending on the wavelengths of the reflected main beams and combines detection outputs from these light receiving regions into a common output. Combining outputs of the light receiving regions assigned for different wavelengths results in serving these light receiving regions as common light receiving regions irrelevant to wavelengths. Combining the outputs of a plurality of light receiving regions results in securing an area for the light receiving regions.

The optical device separately receives reflected sub-beams of different wavelengths with different light receiving regions depending on the wavelengths. Detection outputs from these light receiving regions for reflected sub-beams are separated from one another. This prevents a deterioration of signal modulation level and an offset of an error signal, easily secures a dynamic range for an operation circuit, suppresses an increase in the number of signal output channels to thereby prevent an increase in the size of the operation circuit, and prevents an increase in the number of wiring pins to thereby reduce the size of the optical device.

The present invention also provides an optical device having at least a light receiving element and a hologram element. The hologram element diffracts a plurality of incident beams having different wavelengths. The light receiving element has light receiving regions to receive the diffracted beams. The hologram element is divided into first and second regions each diffracting incident beams having first and second wavelengths that are different from each other. The light receiving element includes a first light receiving region configured to receive reflected main beams of the first and second wavelengths passed through the first region of the hologram element, the reflected main beams being used to detect information from an information recording medium; a second light receiving region configured to receive the reflected main beams of the first and second wavelengths passed through the second region of the hologram element; a third light receiving region configured to receive a reflected first sub-beam of the first wavelength passed through the first region of the hologram element, the received sub-beam being used for a tracking operation; a fourth light receiving region configured to receive a reflected second sub-beam of the first wavelength passed through the first region of the hologram element, the received sub-beam being used for a tracking operation; a fifth light receiving region configured to receive a reflected first sub-beam of the second wavelength passed through the first region of the hologram element, the received sub-beam being used for a tracking operation; a sixth light receiving region configured to receive a reflected second sub-beam of the second wavelength passed through the first region of the hologram element, the received sub-beam being used for a tracking operation; a seventh light receiving region configured to receive the reflected first sub-beam of the first wavelength passed through the second region of the hologram element, the received sub-beam being used for a tracking operation;

an eighth light receiving region configured to receive the reflected second sub-beam of the first wavelength passed through the second region of the hologram element, the received sub-beam being used for a tracking operation; a ninth light receiving region configured to receive the reflected first sub-beam of the second wavelength passed through the second region of the hologram element, the received sub-beam being used for a tracking operation; and a tenth light receiving region configured to receive the reflected second sub-beam of the second wavelength passed through the second region of the hologram element, the received sub-beam being used for a tracking operation. Detection outputs from the third and fourth light receiving regions are combined into a common output. Detection outputs from the seventh and eighth light receiving regions are combined into a common output. Detection outputs from the fifth and ninth light receiving regions are combined into a common output. Detection outputs from the sixth and tenth light receiving regions are combined into a common output.

In the optical device, detection outputs from the third and seventh light receiving regions that receive the reflected first sub-beam of the first wavelength are combined into a common output, detection outputs from the fourth and eighth light receiving regions that receive the reflected second sub-beam of the first wavelength are combined into a common output, detection outputs from the fifth and sixth light receiving regions that receive the reflected sub-beams of the second wavelength through the first region of the hologram element are combined into a common output, and detection outputs from the ninth and tenth light receiving regions that receive the reflected sub-beams of the second wavelength through the second region of the hologram element are combined into a common output. This prevents a deterioration of signal modulation level and an offset of an error signal, easily secures a dynamic range for an operation circuit, suppresses an increase in the number of signal output channels to thereby prevent an increase in the size of the operation circuit, and prevents an increase in the number of wiring pins to thereby reduce the size of the optical device.

In the optical device according to the present invention, the hologram element is substantially halved into the first and second regions along a dividing line that is parallel to a tangent of a recording track of an information recording medium when optically mapped onto the information recording medium so as to halve a reflected beam from the information recording medium in a diameter direction of the information recording medium along the dividing line.

In the optical device according to the present invention, a tracking error signal is detected with the use of a differential push-pull method employing the reflected sub-beams of the first wavelength based on the difference between the detection output of the third and fourth light receiving regions and the detection output of the seventh and eighth light receiving regions. Also a tracking error signal is detected with the use of a three-beam method employing the reflected sub-beams of the second wavelength based on the difference between the detection output of the fifth and ninth light receiving regions and the detection output of the sixth and tenth light receiving regions.

In the optical device according to the present invention, the first wavelength is of a 650-nm band, the second wavelength is of a 780-nm band, and the optical device detects information from two types of information recording media conforming to the first and second wavelengths.

In the optical device according to the present invention, a light source for emitting light of the first wavelength or a light source for emitting light of the second wavelength is integrally formed on a substrate of the light receiving element.

The present invention also provides an optical pickup apparatus having the above-mentioned optical device and a laser source configured to emit light of the first and second wavelengths. The optical device provides an information signal based on main beams and a tracking signal based on sub-beams. The main beams and sub-beams are reflection of the light of any one of the first and second wavelengths from an information recording medium.

The present invention also provides an optical pickup apparatus having the above-mentioned optical device, a laser source configured to emit light of the first wavelength, and a diffraction grating configured to divide the light of the first wavelength emitted from the laser source into three beams. The light source formed in the optical device is a laser source configured to emit light of the second wavelength. The optical device may have a diffraction grating configured to divide the light of the second wavelength emitted from the laser source into three beams.

The present invention also provides an optical pickup apparatus having the above-mentioned optical device, a laser source configured to emit light of the second wavelength, and a diffraction grating configured to divide the light of the second wavelength emitted from the laser source into three beams. The light source formed in the optical device is a laser source configured to emit light of the first wavelength. The optical device may have a diffraction grating configured to divide the light of the first wavelength emitted from the laser source into three beams.

When reproducing or recording/reproducing information signals to and from DVD- and CD-standard optical discs that need light sources of different wavelengths, the optical device and optical pickup apparatus according to the present invention prevent a deterioration of signal modulation level and an offset of an error signal, easily secure a dynamic range for an operation circuit, suppress an increase in the number of signal output channels to thereby prevent an increase in the size of the operation circuit, and prevent an increase in the number of wiring pins to thereby reduce the size of the optical device.

The optical device according to the present invention can handle information recording media using light sources of different wavelengths, such as DVD-standard optical discs (recordable optical discs of DVD-RAM, DVD-R, DVD-RW, +R, and +RW standards employing a laser beam of 650-nm band) and CD-standard optical discs (recordable optical discs of CD-R and CD-RW standards employing a laser beam of 780-nm band).

The optical device employs the DPP (differential push-pull) method to detect a tracking error signal when recording an information signal on a DVD-standard optical disc, and the three-beam method for a CD-standard optical disc. In this way, the optical device according to the present invention employs different error detection methods depending on information recording media without increasing the number of signal output channels or the size of an operation circuit.

Laser light condensed on an optical disc through an objective lens includes a component condensed to a spot as well as a flare component caused by diffraction of the objective lens. The optical device according to the present invention can suppress the influence of reflection of the flare component that diffuses over the light receiving element of the optical device, thereby preventing a deterioration of signal modulation level and an offset of an error signal.

When reproducing a DVD-standard optical disc having two recording layers, reflection from a non-objective recording layer may spread over the light receiving element of the optical device. The optical device according to the present invention can suppress the influence of such reflection, thereby preventing a deterioration of signal modulation level and an offset of an error signal.

The optical device prepares three beams, i.e., a main beam and two sub-beams when achieving the three-beam method or the DPP method. To secure recording power, the intensity of the main beam is set to be greater than that of the sub-beams. In this case, the optical device according to the present invention can suppress the influence of diffusion of the main beam over light receiving regions for the sub-beams, thereby preventing a deterioration of signal modulation level and an offset of an error signal and securing a dynamic range for an operation circuit.

The optical device employs the hologram element to diffract incident beams of different wavelengths. There is no need for the optical device of the present invention to increase the area of each light receiving region for sub-beams. This results in reducing the influence of unnecessary reflected beams, preventing a deterioration of signal modulation level and an offset of an error signal, and securing a dynamic range for an operation circuit.

In this way, the present invention provides the optical device and the optical pickup apparatus employing the optical device, capable of reproducing or recording/reproducing information signals to and from DVD- and CD-standard optical discs that need light sources of different wavelengths, avoiding an influence of unnecessary reflected light from an optical disc, and simplifying operation to be carried out on output signals.

BRIEF DESCRIPTION OF DRAWINGS

FIG. 8(a) is a plan view showing an operation circuit of the optical device of the present invention when processing a tracking error signal related to the first-type optical disc; and FIG. 8(b) is a plan view showing the operation circuit of the optical device of the present invention when processing a tracking error signal related to the second-type optical disc.

BEST MODE FOR CARRYING OUT THE INVENTION

An optical device and an optical pickup apparatus according to embodiments of the present invention will be explained in detail with reference to the drawings.

[Structure of Optical Pickup Apparatus]

Figure 1:
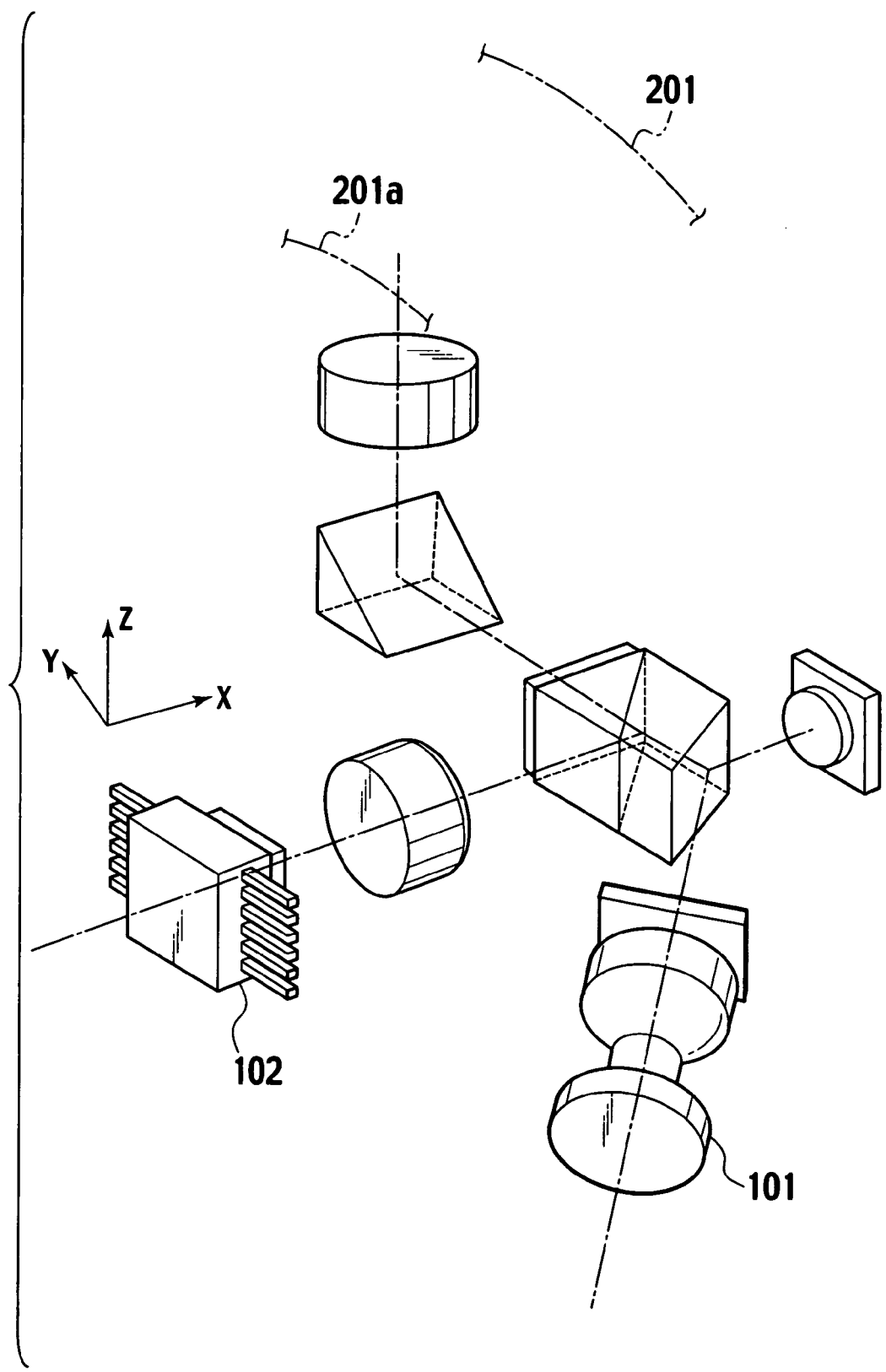
FIG. 1 is a perspective view showing the structure of an optical pickup apparatus according to a related art.
Figure 2:
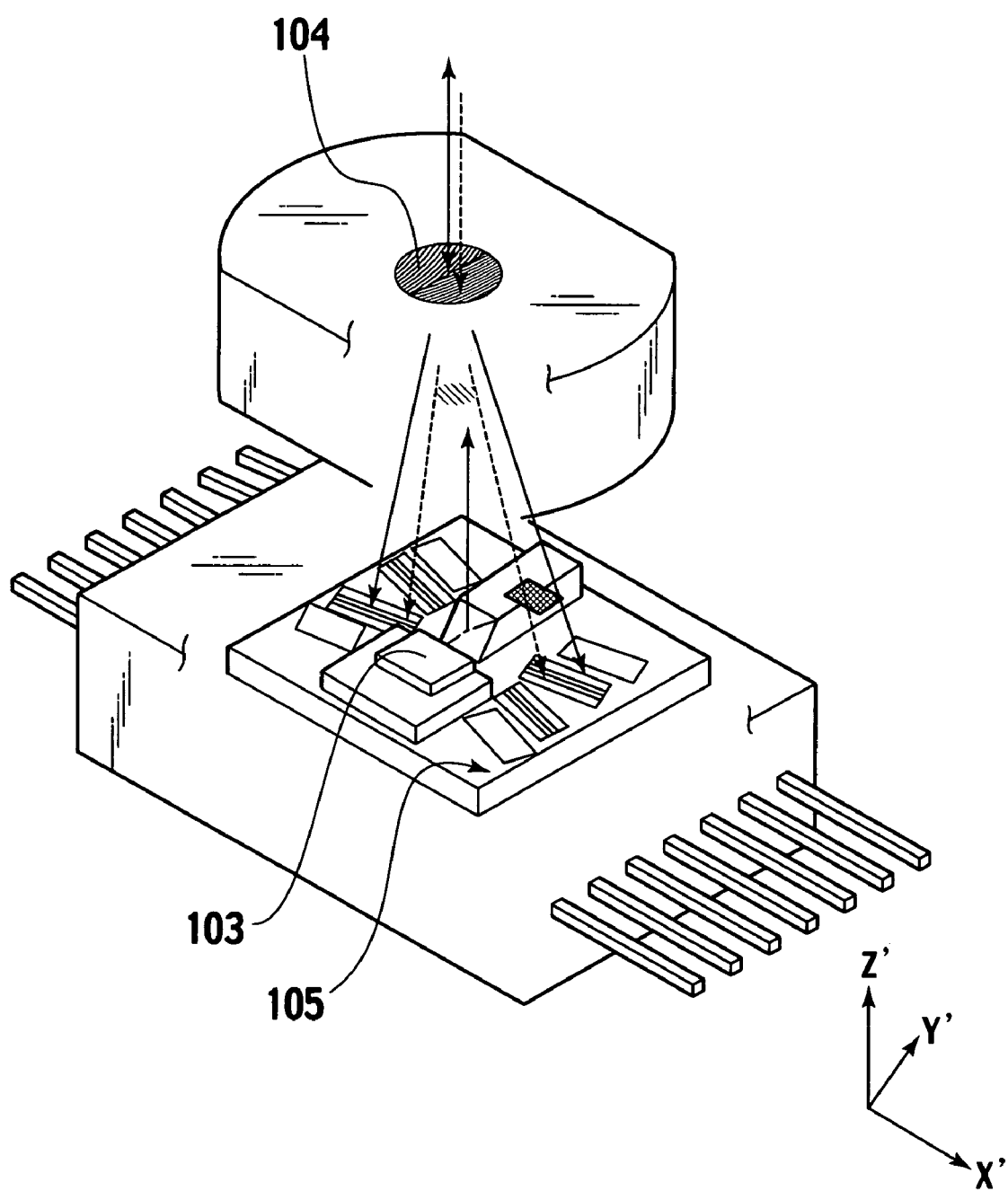
FIG. 2 is a perspective view showing the structure of an optical device according to the related art.
Figure 3:
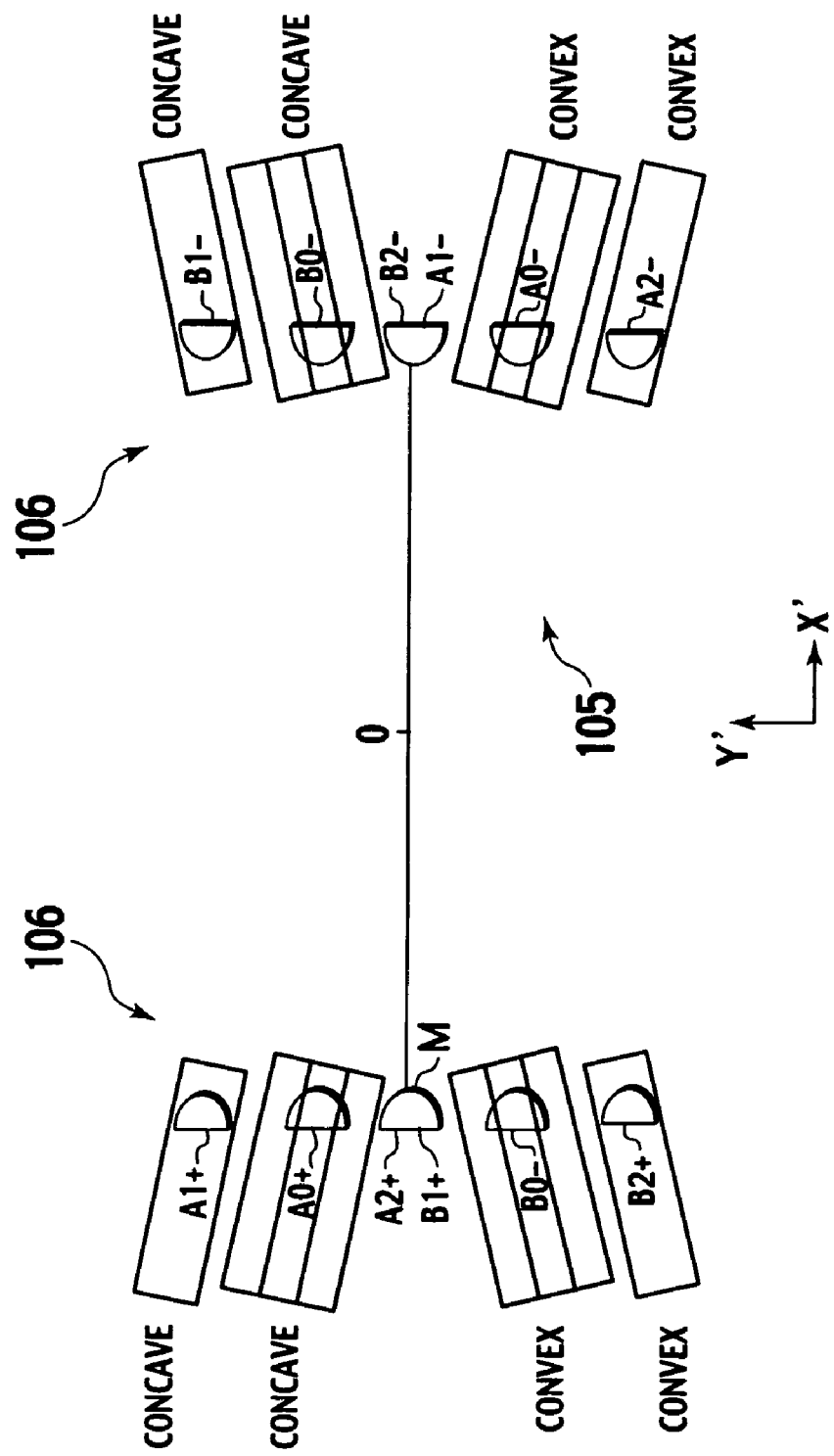
FIG. 3 is a plan view showing a light receiving element of the optical device of the related art.
Figure 4:
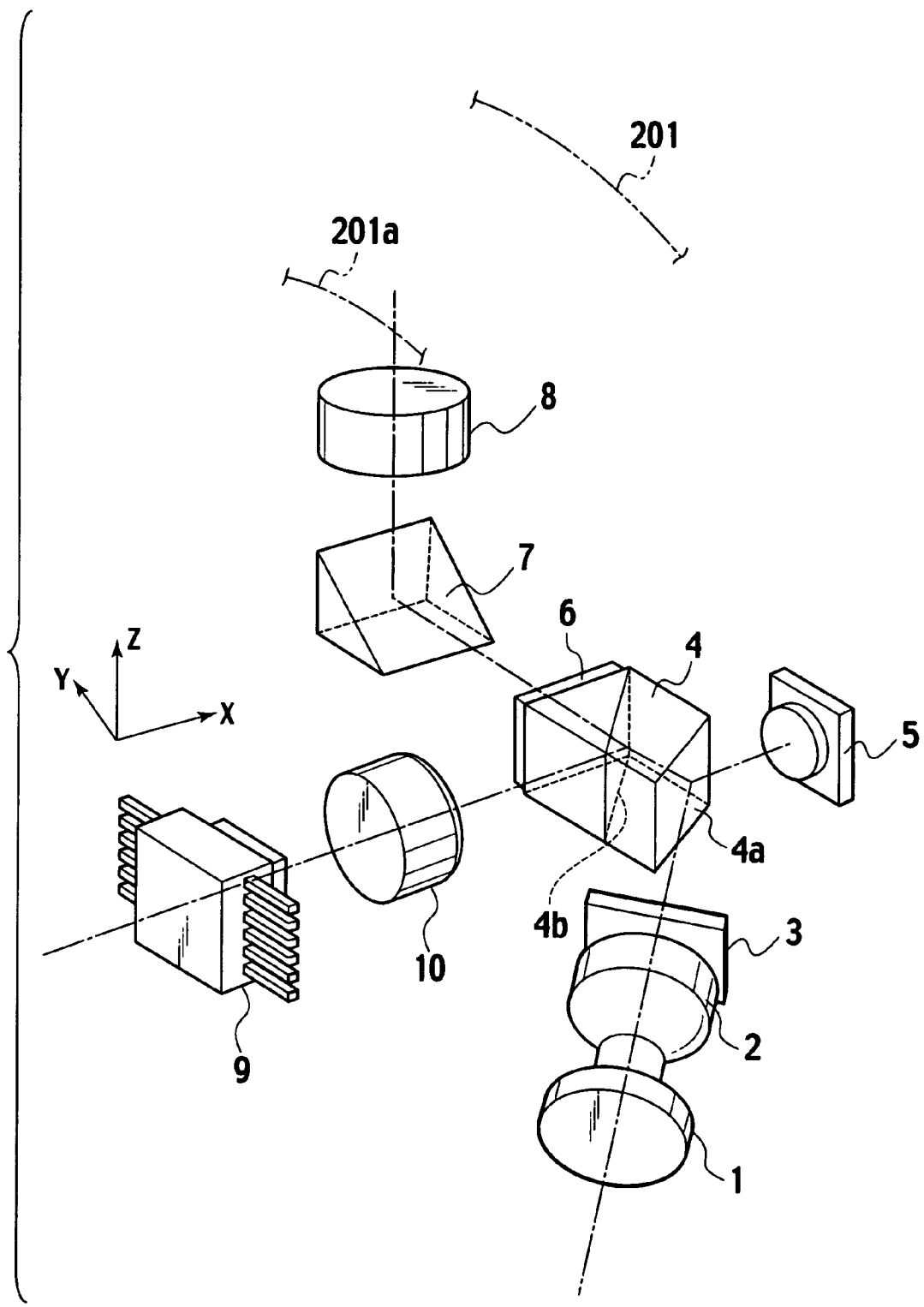
FIG. 4 is a perspective view showing the structure of an optical pickup apparatus according to the present invention.

FIG. 4 is a perspective view showing the structure of an optical pickup apparatus according to the present invention.

The optical pickup apparatus shown in FIG. 4 has a first laser source 1 to emit laser light having a first wavelength (of, for example, a 650-nm band). The laser light of first wavelength emitted from the first laser source 1 is passed through a collimator lens 2, to become parallel light. The parallel light is divided through a first grating 3 into a 0th-order beam, a +1st-order beam, and a −1st-order beam. The three beams are made incident to a beam splitter prism 4 having a beam shaping function. The 0th-order beam from the first grating (diffraction grating) 3 becomes a main beam to record or reproduce an information signal to or from an optical disc. The ±1st-order beams become first and second sub-beams to detect a tracking error signal.

At the beam splitter prism 4, the laser light of first wavelength is obliquely made incident to an incident face 4a, is shaped thereby, and enters the beam splitter prism 4.

On the incident face 4a of the beam splitter prism 4, the laser light of first wavelength is partly reflected, and the reflected part is received by a first monitor photodiode 5 to detect laser power.

The laser light of first wavelength in the beam splitter prism 4 is transmitted through a reflection film 4b for beam separation, is emitted from the beam splitter prism 4, and is transmitted through a λ/4 (quarter wave) plate 6 to become circularly polarized light.

The laser light of first wavelength is reflected by a mirror 7 so as to bend its optical path and is made incident to an objective lens 8. The objective lens 8 condenses the laser light of first wavelength onto a signal recording face of a first-type optical disc 201 that is an information recording medium conforming to the laser light of first wavelength. The first-type optical disc is, for example, a DVD-standard optical disc.

The optical pickup apparatus has an optical device 9 according to the present invention. The optical device 9 incorporates a second laser source (to be explained later) for emitting laser light having a second wave length (of, for example, 780-nm band). The laser light of second wavelength emitted from the second laser source emanates from the optical device 9 and is passed through a collimator lens 10, to become parallel light. The parallel light is made incident to the beam splitter prism 4.

In the beam splitter prism 4, the laser light of second wavelength is reflected by the reflection film 4b, is emitted from the beam splitter prism 4, and is transmitted through the λ/4 (quarter wave) plate 6.

The laser light of second wavelength is reflected by the mirror 7 so as to bend its optical path and is made incident to the objective lens 8. The objective lens 8 condenses the laser light of second wavelength onto a signal recording face of a second-type optical disc 201 that is an information recording medium conforming to the laser light of second wavelength. The second-type optical disc is, for example, a CD-standard optical disc.

In the optical pickup apparatus, the laser light of first wavelength condensed on the signal recording face of the first-type optical disc 201 is reflected by the signal recording face. The laser light of second wavelength condensed on the signal recording face of the second-type optical disc 201 is reflected by the signal recording face. The reflected laser light of first or second wavelength is passed through the objective lens 8, is reflected by the mirror 7, and is made incident to the beam splitter prism 4. In the beam splitter prism 4, the reflected light of first or second wavelength is reflected by the reflection film 4b and is emitted from the beam splitter prism 4 toward the optical device 9.

The reflected light enters the optical device 9 and is received by a light receiving element incorporated in the optical device 9. According to optical detection outputs from the light receiving element, an information signal and an error signal related to the optical disc are obtained.

[Structure of Optical Device]

Figure 5:
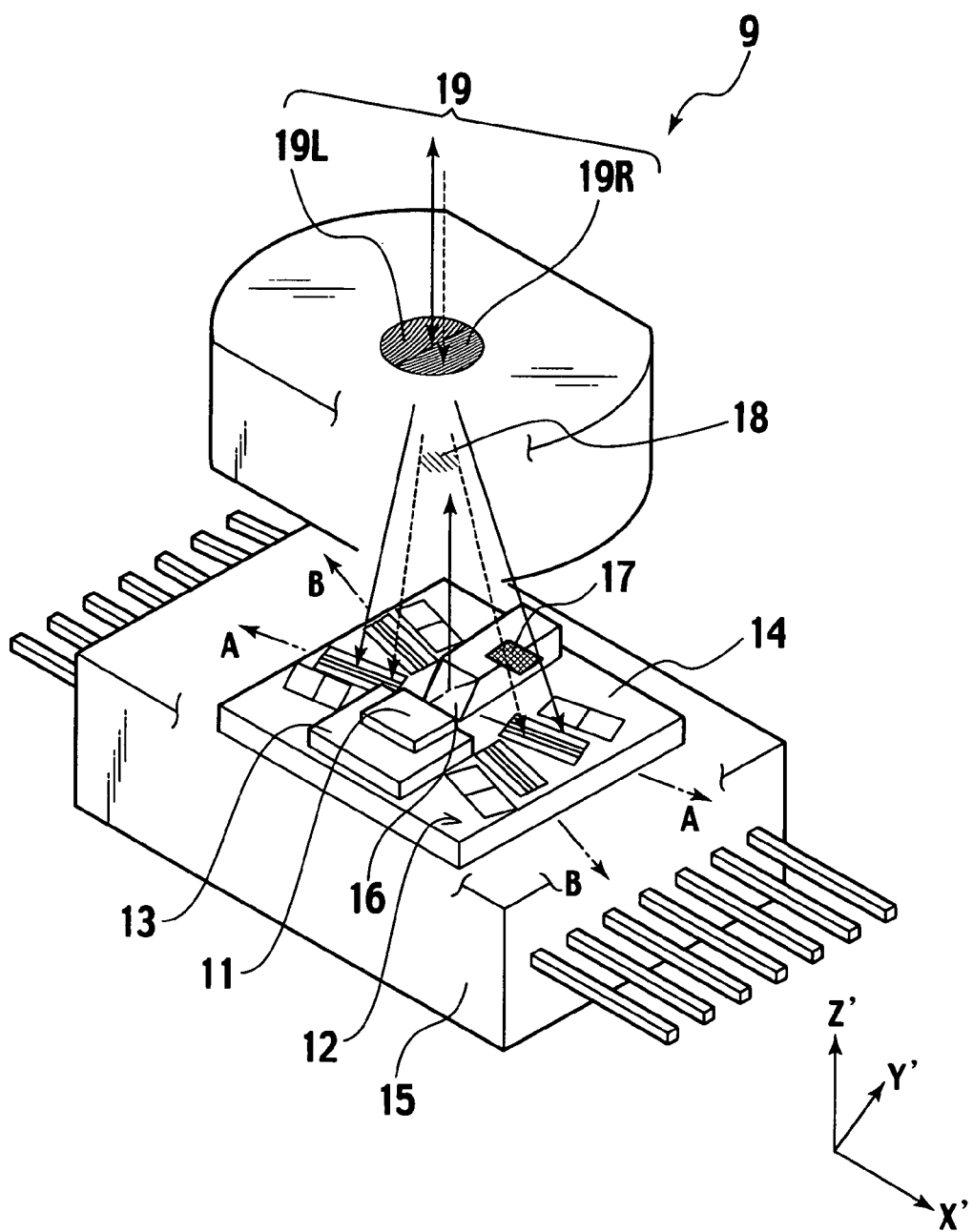
FIG. 5 is a perspective view showing an optical device according to the present invention.

FIG. 5 is a perspective view showing the structure of the optical device according to the present invention.

The optical device shown in FIG. 5 has the second laser source 11 to emit the laser light of second wavelength and the light receiving element 12 to receive reflected light from the optical disc 201.

The second laser source 11 is arranged on a sub-mount 13, which is arranged on a light receiving element base 14. The base 14 is supported on a package (casing) 15. The second laser source 11 is arranged so as to emit the laser light of second wavelength in a direction parallel to the surface of the base 14.

The second laser source 11 is positioned on the light receiving element base 14 so that reflected light of the laser light of first wavelength and the laser light of second wavelength may be condensed and returned to the same position in the optical device 9. Namely, the second laser source 11 is set so that an optical axis of reflected light of the laser light of first wavelength may agree with an optical axis of reflected light of the laser light of second wavelength on the light receiving element 12. The second laser source 11 is set so that a conjugate point of an emission point of the laser light of first wavelength may agree with an emission point of the laser light of second wavelength, or the conjugate point of the laser light of first wavelength and the emission point of the laser light of second wavelength may be on the same optical axis. The conjugate point of the laser light of first wavelength is a point where an image of an emission point of the laser light of first wavelength is formed in an optical system including the beam splitter prism 4.

The light receiving element 12 is formed on the light receiving element base 14 supported on the package 15. The light receiving element 12 has a plurality of light receiving regions formed on the surface of the base 14 and receives light made incident to the surface of the base 14 at an incident angle of, for example, 10 to 20 degrees.

The optical device 9 has a micromirror 16. The second laser source 11 emits the laser light of second wavelength in parallel with the surface of the light receiving element base 14 (in a Y'-axis direction in FIG. 5). The micromirror 16 reflects the laser light of second wavelength in a direction perpendicular to the surface of the base 14 (in a Z'-axis direction in FIG. 5). The micromirror 16 is a prism having an oblique end face inclined at an angle of 45°. The oblique end face reflects the laser light of second wavelength. The micromirror 16 is set on the base 14 so that the oblique end face of the micromirror 16 is oriented toward the second laser source 11.

At the position on the light receiving element base 14 where the micromirror 16 is arranged, there is a second monitor photodiode 17 to detect power of the laser light of second wavelength. The laser light of second wavelength is partly reflected by the oblique end face of the micromirror 16, and the remnant of the laser light of second wavelength is transmitted through the oblique end face of the micromirror 16 and is received by the second monitor photodiode 17.

The laser light of second wavelength reflected by the micromirror 16 is divided through a second grating (diffraction grating) 18 into a 0th-order beam, a +1st-order beam, and a −1st-order beam. The 0th-order beam from the second grating 18 becomes a main beam to record or reproduce an information signal to or from an optical disc. The ±1st-order beams become first and second sub-beams to detect a tracking error signal.

The laser light of second wavelength from the second grating 18 is transmitted through a hologram element 19 and is emitted from the optical device 9. The optical device 9 performs a diffraction action on the light (outgoing light) emitted from the optical device 9. However, the diffracted component of the outgoing light is not used.

The optical device 9 receives reflected light (return light) of the first wavelength from the first-type optical disc, as well as reflected light (return light) of the second wavelength from the second-type optical disc. The reflected light is transmitted through the hologram element 19 and advances toward the light receiving element base 14. The hologram element 19 is an optical element made of a transparent substrate on which a periodic fine irregularity structure is formed from an optically transparent material.

The hologram element 19 is divided into first and second regions 19L and 19R having different characteristics. The hologram element 19 as a whole has a circular shape, and the first and second regions 19L and 19R are formed by halving the hologram element 19 into semicircles.

A dividing line that divides the hologram element 19 into the first and second regions 19L and 19R passes through the center (optical axis) of the hologram element 19 and is parallel to a tangent of the recording track 201a of the optical disc 201 when optically mapped onto the optical disc 201. Namely, reflected light from the optical disc 201 is halved by the dividing line of the hologram element 19 with respect to the diameter of the optical disc 201, so that one half is transmitted through the first region 19L and the other half through the second region 19R.

Each of the first and second regions 19L and 19R of the hologram element 19 diffracts the reflected light of first or second wavelength and provides ±1st-order diffracted beams that are used to obtain a tracking error signal and a focus error signal.

The first region 19L diffracts the reflected light of first or second wavelength in directions indicated with arrows A in FIG. 5, to provide ±1st-order diffracted beams. The second region 19R diffracts the reflected light of first or second wavelength in directions indicated with arrows B in FIG. 5, to provide ±1st-order diffracted beams. The diffraction directions of the first region 19L are different from those of the second region 19R.

Figure 6:
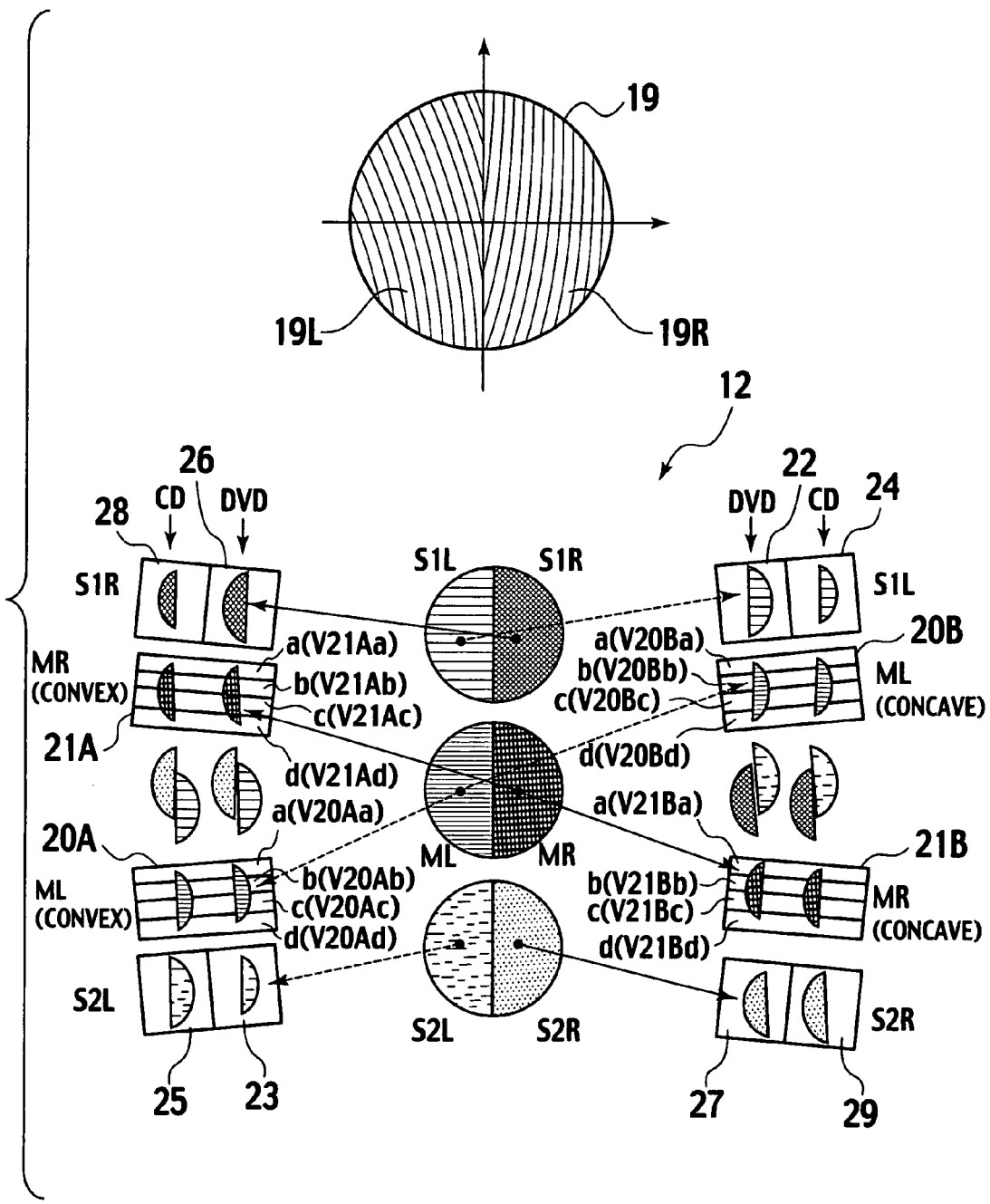
FIG. 6 is a plan view showing a relationship between a hologram element and a light receiving element in the optical device of the present invention.

FIG. 6 is a plan view showing relationships between the divided regions of the hologram element 19 and the light receiving regions of the light receiving element 12.

In FIG. 6, the hologram element 19 is halved into the first and second regions 19L and 19R in the diameter direction of the optical disc 201 when optically mapped onto the optical disc 201. Diffraction axes of the regions 19L and 19R are inclined relative to each other.

A part ML of the reflected main beam from the optical disc 201 is transmitted through the first region 19L of the hologram element 19, and a part MR thereof is transmitted through the second region 19R of the hologram element 19.

The parts ML and MR are diffracted in the different directions and are received by different ones of the light receiving regions of the light receiving element 12.

More precisely, a pair of first light receiving regions 20A and 20B of the light receiving element 12 receive parts ML(convex) and ML(concave) of the reflected main beam of first and second wavelengths passed through the first region 19L of the hologram element 19. At the same time, a pair of second light receiving regions 21A and 21B of the light receiving element 12 receive parts MR(convex) and MR(concave) of the reflected main beam of first and second wavelengths passed through the second region 19R of the hologram element 19.

Each of the first and second light receiving regions 20A, 20B, 21A, and 21B is quartered in parallel in a direction substantially orthogonal to the direction in which the hologram element 19 is divided into the regions 19L and 19R. Each quartered section of the first and second light receiving regions 20A, 20B, 21A, and 21B separately provides an optical detection signal.

According to the optical detection signals from the quartered sections of the first and second light receiving regions 20A, 20B, 21A, and 21B, an information signal, a focus error signal, a wobble signal, and the like concerning the optical disc are obtained.

Namely, the outputs of the first and second light receiving regions 20A, 20B, 21A, and 21B are totaled to obtain an information signal read from the optical disc.

A difference between the sum of the outputs of the first light receiving regions 20A and 20B and the sum of the outputs of the second light receiving regions 21A and 21B is passed through a band-pass filter, to obtain a wobble signal.

The outputs of two central sections (20Ab, 20Ac, 21Ab, 21Ac) of each of the first and second light receiving regions 20A and 21A and the outputs of two side sections (20Ba, 20Bd, 21Ba, 21Bd) of each of the light receiving regions 20B and 21B are summed up. Similarly, two central sections (20Bb, 20Bc, 21Bb, 21Bc) of each of the light receiving regions 20B and 21B and the outputs of two side sections (20Aa, 20Ad, 21Aa, 21Ad) of each of the light receiving regions 20A and 21A are summed up. Thereafter, a difference between the two sums is found to obtain a focus error signal according to a so-called SSD (spot size) method.

The first region 19L of the hologram element 19 has convex lens power for the +1st-order diffracted beam and concave lens power for the −1st-order diffracted beam. The second region 19R of the hologram element 19 has concave lens power for the +1st-order diffracted beam and convex lens power for the −1st-order diffracted beam. Accordingly, the focus error signal is producible according to the output signals of the divided sections of the first and second light receiving regions 20A, 20B, 21A, and 21B. The focus error signal FE is obtained with output signals V20Aa, V20Ab, V20Ac, V20Ad, V20Ba, V20Bb, V20Bc, and V20Bd from the divided sections of the first light receiving regions 20A and 20B and with output signals V21Aa, V21Ab, V21Ac, V21Ad, V21Ba, V21Bb, V21Bc, and V21Bd from the divided sections of the second light receiving regions 21A and 21B as follows:

$$FE=\{(V20Ab+V20Ac+V20Ba+V20Bd)+(V21Ab+V21Ac+V21Ba+V21Bd)\}-\{(V20Aa+V20Ad+V20Bb+V20Bc)+(V21Aa+V21Ad+V21Bc)\}$$

The reflected first and second sub-beams from the optical disc 201 are divided into parts S1L and S2L through the first region 19L of the hologram element 19 and parts S1R and S2R through the second region 19R of the hologram element 19. The beam parts S1L, S2L, S1R, and S2R are diffracted in different directions and are received by different light receiving regions of the light receiving element 12.

The first and second sub-beams are passed through the first diffraction grating 3 or the second diffraction grating 18 and irradiate a recording track of the optical disc. On the optical disc, the first and second sub-beams are oppositely spaced from the main beam by an identical angle in a tangential direction of the recording track in terms of an optically mapped image. On the signal recording face of the optical disc, the first and second sub-beams each are deviated from the recording track in a diameter direction by ½ track pitch in case of the laser light of first wavelength (DVD-standard optical disc) and by ¼ track pitch in case of the laser light of second wavelength (CD-standard optical disc). The sub-beams are reflected by the signal recording face of the optical disc and the reflected beams are made incident to the optical device 9.

When transmitted through the hologram element 19 of the optical device 9, the sub-beams spatially overlap the main beam, and therefore, are diffracted together with the main beam by the hologram element 19. When reaching the surface of the light receiving element base 14, the sub-beams each have a diameter of about several tens of micrometers and are spaced from one another. In this state, the sub-beams are received by the corresponding light receiving regions.

In the light receiving element 12, a third light receiving region 22 receives the reflected beam part S1L of the first sub-beam of first wavelength passed through the first region 19L of the hologram element 19.

In the light receiving element 12, a fourth light receiving region 23 receives the reflected beam part S2L of the second sub-beam of first wavelength passed through the first region 19L of the hologram element 19.

In the light receiving element 12, a fifth light receiving region 24 receives the reflected beam part S1L of the first sub-beam of second wavelength passed through the first region 19L of the hologram element 19.

In the light receiving element 12, a sixth light receiving region 25 receives the reflected beam part S2L of the second sub-beam of second wavelength passed through the first region 19L of the hologram element 19.

In the light receiving element 12, a seventh light receiving region 26 receives the reflected beam part S1R of the first sub-beam of first wavelength passed through the second region 19R of the hologram element 19.

In the light receiving element 12, an eighth light receiving region 27 receives the reflected beam part S2R of the second sub-beam of first wavelength passed through the second region 19R of the hologram element 19.

In the light receiving element 12, a ninth light receiving region 28 receives the reflected beam part S1R of the first sub-beam of second wavelength passed through the second region 19R of the hologram element 19.

In the light receiving element 12, a tenth light receiving region 29 receives the reflected beam part S2R of the second sub-beam of second wavelength passed through the second region 19R of the hologram element 19.

In connection with an advancing direction of each sub-beam relative to a recording track on an optical disc, a leading sub-beam is the first sub-beam S1 and a trailing sub-beam is the second sub-beam S2. These reflected sub-beams are diffracted by the first and second regions 19L and 19R of the hologram element 19, to form the reflected sub-beams S1L, S1R, S2L, and S2R. As shown in FIG. 6, these reflected sub-beams maintain positional relationships with respect to the reflected main beams and are received by the corresponding light receiving regions.

To detect a focus error signal, each of the reflected main beam receiving regions 20A, 20B, 21A, and 21B is divided in parallel into four sections. On the other hand, each of the reflected sub-beam receiving regions is not divided into sections because it is only required to totally detect the integrated quantity of light for each of the reflected sub-beams.

Due to a diffraction principle, the hologram element 19 provides different diffraction angles for different wavelengths of transmitted light. Accordingly, the hologram element 19 diffracts the sub-beam of second wavelength (790-nm band) larger than the sub-beam of first wavelength (650-nm band) that is shorter than the second wavelength. As shown in FIG. 6, the sub-beam of first wavelength is received on an inner side (closer to an optical axis) of the light receiving region, and the sub-beam of second wavelength is received on an outer side (farther from the optical axis) of the light receiving region. Depending on the arriving positions of the sub-beams, the light receiving regions for the sub-beams are slightly inclined and are each formed in a rectangular shape.

The optical device 9 uses one of the two ±1st-order diffracted sub-beams provided by the hologram element 19.

Figure 7:
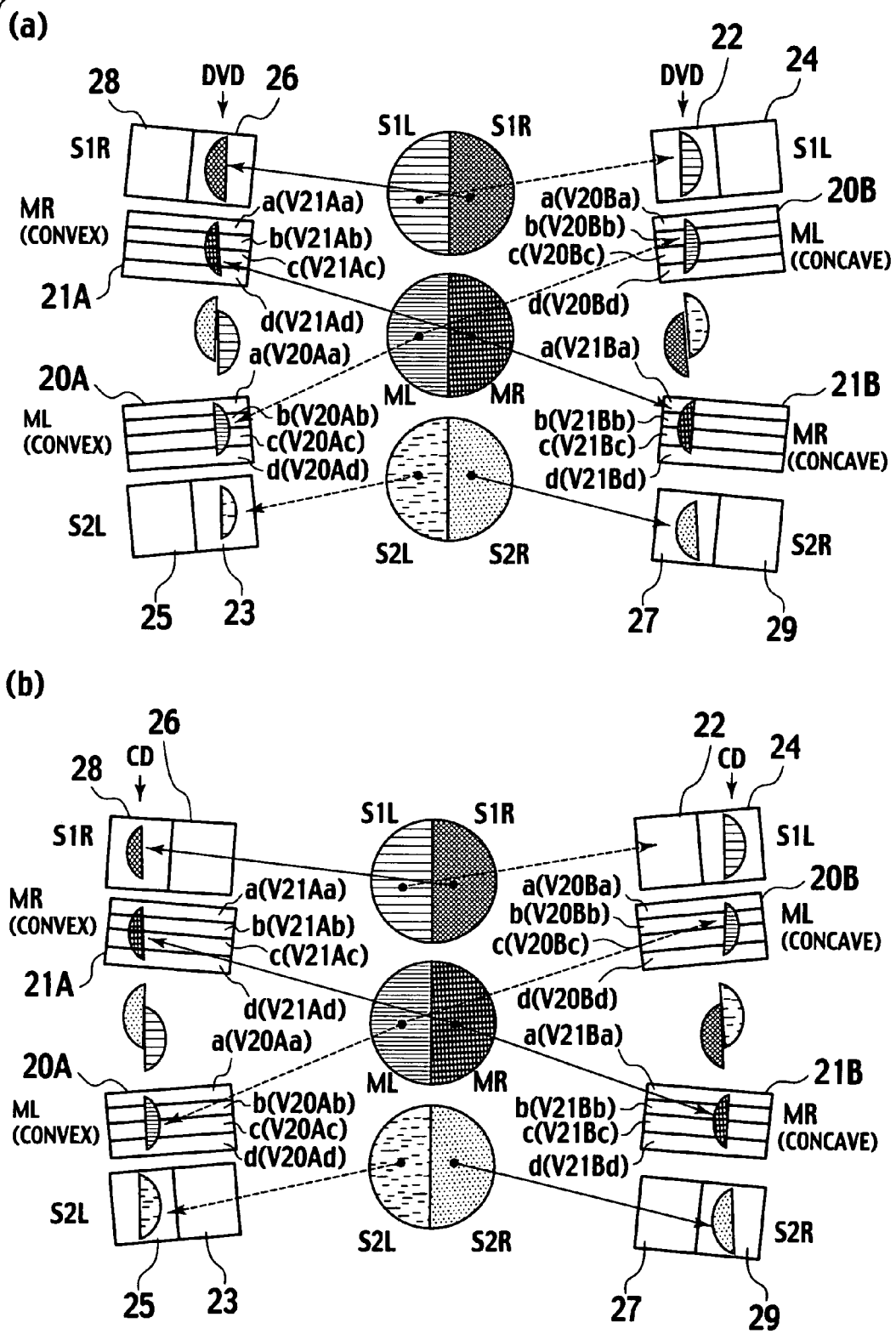
FIG. 7(a) is a plan view showing states of reflected light on the light receiving element of the optical device of the present invention when a first-type optical disc is used.
FIG. 7(b) is a plan view showing states of reflected light on the light receiving element of the optical device of the present invention when a second-type optical disc is used.

FIG. 7(a) is a plan view showing states of reflected beams on the light receiving element of the optical device when the first-type optical disc is used and FIG. 7(b) is a plan view showing states of reflected beams on the light receiving element of the optical device when the second-type optical disc is used.

For the first-type optical disc, the optical pickup apparatus employs the laser source of first wavelength to record or reproduce information. In this case, the optical device 9 receives, as shown in FIG. 7(a), a reflected main beam with the first to fourth light receiving regions 20A, 20B, 21A, and 21B, a reflected first sub-beam with the third and seventh light receiving regions 22 and 26, and a reflected second sub-beam with the fourth and eighth light receiving regions 23 and 27.

For the second-type optical disc, the optical pickup apparatus employs the laser source of second wavelength to record or reproduce information. In this case, the optical device 9 receives, as shown in FIG. 7(b), a reflected main beam with the first to fourth light receiving regions 20A, 20B, 21A, and 21B, a reflected first sub-beam with the fifth and ninth light receiving regions 24 and 28, and a reflected second sub-beam with the sixth and tenth light receiving regions 25 and 29.

In the optical device 9, the objective lens 8 of the optical pickup apparatus produces a flare. If the optical disc has two recording layers, the recording layer that is not a reproducing object reflects unnecessary light. Such flare and unnecessary light spreads over the light receiving element base 14, to produce a direct current (DC) component in an optical detection output. The DC component is substantially proportional to the area of a given light receiving region and is irrelevant to the intensity of a light spot received at the given light receiving region.

In the optical device 9, the reflected sub-beam of first wavelength and the reflected sub-beam of second wavelength are received by different light receiving regions even if the reflected sub-beams are transmitted through the same region of the hologram element 19.

Accordingly, the optical device 9 can minimize the area of each light receiving region for receiving a reflected sub-beam, thereby suppressing the influence of the unnecessary light.

FIG. 8(a) is a plan view showing an operation circuit when providing a tracking error signal TE(DPP) for the first-type optical disc and FIG. 8(b) is a plan view showing the operation circuit when providing a tracking error signal TE(3beam) for the second-type optical disc.

In the optical device, a tracking error signal is generated according to a method that is dependent on the type of an optical disc.

For the first-type optical disc (DVD-standard optical disc), the differential push-pull (DPP) method is employed as shown in FIG. 8(a) to provide a tracking error signal TE(DPP). The differential push-pull method processes a push-pull signal (MainPP) related to a main beam and push-pull signals (SubPP) related to first and second sub-beams, to generate the tracking error signal TE(DPP).

The push-pull signal (MainPP) related to a main beam corresponds to a difference between the intensity of a reflected main beam transmitted through the first region 19L of the hologram element 19 and the intensity of the reflected main beam transmitted through the second region 19R of the hologram element 19 and is obtained as follows:

$$\begin{aligned} MainPP &= (MR - ML) \\ &= \{(V20Aa + V20Ab + V20Ac + V20Ad) + \\ &\quad (V20Ba + V20Bb + V20Bc + V20Bd)\} - \\ &\quad \{(V21Aa + V21Ab + V21Ac + V21Ad) + \\ &\quad (V21Ba + V21Bb + V21Bc + V21Bd)\} \end{aligned}$$

The push-pull signal (SubPP) of each sub-beam corresponds to a difference between the intensity of the sub-beam transmitted through the first region 19L of the hologram element 19 and the intensity of the sub-beam transmitted through the second region 19R of the hologram element 19 and is obtained as follows:

$$SubPP = (S1R + S2R) - (S1L + S2L)$$

The tracking error signal (TE(DPP)) is obtained with a coefficient k that is an inverse of the ratio of the intensity of the main beam to the sum of the intensities of the sub-beams and is expressed as follows:

$$\begin{aligned} TE(DPP) &= MainPP - k(SubPP) \\ &= (MR - ML) - k\{(S1R + S2R) - (S1L + S2L)\} \end{aligned}$$

In the optical device 9, detection outputs from the third and fourth light receiving regions 22 and 23 are combined into a common output, and detection outputs from the seventh and eighth light receiving regions 26 and 27 are combined into a common output. Accordingly, there is no need of calculating (S1R+S2R) and (S1L+S2L). Due to this, the push-pull signal (SubPP) of sub-beams is obtained with a single subtracter 30 as shown in FIG. 8(a).

The constant k is a predetermined constant that is determined by a branching ratio of the main beam and sub-beams at the first grating 3. If k=0, then a tracking error signal (TEPP) according to the push-pull method is obtainable only from the reflected main beam.

In the optical device, each of the first light receiving regions 20A and 20B and second light receiving regions 21A and 21B for receiving a reflected main beam may be divided in parallel into three sections. When recording information to an optical disc, each three sections are sufficient to obtain a push-pull signal (MainPP) and a tracking error signal (TE(DPP)) based on the differential push-pull method. When reproducing information from an optical disc according to a phase differential (DPD) method, the quartering technique mentioned above is needed.

When employing the second-type optical disc (CD-standard optical disc), the three-beam method is used which generates a tracking error signal TE(3beam) from the difference between the intensity of a first reflected sub-beam and the intensity of a second reflected sub-beam.

As shown in FIG. 8(b), the tracking error signal (TE(3beam)) is obtained as follows:

$$TE(3beam)=S1-S2=(S1L+S1R)-(S2L+S2R)$$

In the optical device 9, detection outputs from the fifth and ninth light receiving regions 24 and 28 are combined into a common output, and detection outputs from the sixth and tenth light receiving regions 25 and 29 are combined into a common output. Accordingly, there is no need of calculating (S1L+S1R) and (S2L+S2R). Due to this, the tracking error signal (TE(3beam)) is obtained with a single subtracter 31 as shown in FIG. 8(b).

In the optical device 9, the light receiving regions for receiving the sub-beams of first wavelength are wired so as to electrically connect S1L and S2L to each other and so as to electrically connect S1R and S2R to each other. In the optical device 9, the light receiving regions for receiving the sub-beams of second wavelength are wired so as to electrically connect S1L and S1R to each other and so as to electrically connect S2L and S2R to each other.

In the consequence, the two subtracters 30 and 31 can provide the tracking error signal (TE(3beam)) and the push-pull signal (SubPP) for sub-beams as shown in FIG. 8.

In this way, the optical device 9 can reduce the size of the operation circuit, suppress the influence of unnecessary light on reflected sub-beams whose intensity is weak, and minimize offsets.

The structures of the hologram element 19 and light receiving element 12 of the optical device according to the present invention used to obtain the tracking error signal TE(DPP) and focus error signal (FE) are not limited to those mentioned above. They may be replaced with any other known structures.

The invention claimed is:

1. An optical device for an optical pickup apparatus for recording or reproducing information with respect to an information recording medium, comprising:
a hologram element divided into first and second regions having different diffraction axes and configured to diffract incident light of first and second wavelengths that are different from each other; and
a light receiving element configured to receive the diffracted incident beams from the hologram element,
the light receiving element comprising:
first light receiving regions configured to commonly receive diffracted beams from the first and second regions of the hologram element without regard to the wavelengths of the diffracted beams, the diffracted beams originating from main beams that are emitted toward the information recording medium to detect information from the information recording medium, are reflected by the information recording medium, and are diffracted by the first and second regions of the hologram element; and
second light receiving regions each including a pair of sections to separately receive diffracted sub-beams depending on the wavelengths of the diffracted sub-beams, the diffracted sub-beams originating from first and second sub-beams that are emitted toward the information recording medium, are reflected by the information recording medium, are diffracted through the first and second regions of the hologram element, and are used to conduct a tracking operation along a track of the information recording medium,
diffracted beams from the first region of the hologram element originating from incident light of the first wavelength being detected by the second light receiving regions and combined into a common output,
diffracted beams from the second region of the hologram element originating from the incident light of the first wavelength being detected by the second light receiving regions and combined into a common output,
diffracted beams from the first and second regions of the hologram element originating from the first sub-beam of the second wavelength being detected by the second light receiving regions and combined into a common output,
diffracted beams from the first and second regions of the hologram element originating from the second sub-beam of the second wavelength being detected by the second light receiving regions and combined into a common output.

2. The optical device as set forth in claim 1, wherein the hologram element is substantially halved into the first and second regions along a dividing line that is parallel to a tangent of the track of the information recording medium when optically mapped onto the information recording medium so as to halve a reflected beam from the information recording medium in a diameter direction of the information recording medium along the dividing line.

3. An optical device comprising at least a light receiving element and a hologram element, the hologram element diffracting a plurality of incident beams having different wavelengths, the light receiving element having light receiving regions to receive the diffracted beams,
the hologram element being divided into first and second regions each diffracting incident beams having first and second wavelengths that are different from each other,
the light receiving element comprising:
a first light receiving region configured to receive reflected main beams of the first and second wavelengths passed through the first region of the hologram element, the reflected main beams being used to detect information from an information recording medium;
a second light receiving region configured to receive the reflected main beams of the first and second wavelengths passed through the second region of the hologram element;
a third light receiving region configured to receive a reflected first sub-beam of the first wavelength passed through the first region of the hologram element, the received sub-beam being used for a tracking operation;
a fourth light receiving region configured to receive a reflected second sub-beam of the first wavelength passed through the first region of the hologram element, the received sub-beam being used for a tracking operation;

a fifth light receiving region configured to receive a reflected first sub-beam of the second wavelength passed through the first region of the hologram element, the received sub-beam being used for a tracking operation;

a sixth light receiving region configured to receive a reflected second sub-beam of the second wavelength passed through the first region of the hologram element, the received sub-beam being used for a tracking operation;

a seventh light receiving region configured to receive the reflected first sub-beam of the first wavelength passed through the second region of the hologram element, the received sub-beam being used for a tracking operation;

an eighth light receiving region configured to receive the reflected second sub-beam of the first wavelength passed through the second region of the hologram element, the received sub-beam being used for a tracking operation;

a ninth light receiving region configured to receive the reflected first sub-beam of the second wavelength passed through the second region of the hologram element, the received sub-beam being used for a tracking operation; and a tenth light receiving region configured to receive the reflected second sub-beam of the second wavelength passed through the second region of the hologram element, the received sub-beam being used for a tracking operation;

detection outputs from the third and fourth light receiving regions being combined into a common output, detection outputs from the seventh and eighth light receiving regions being combined into a common output, detection outputs from the fifth and ninth light receiving regions being combined into a common output, detection outputs from the sixth and tenth light receiving regions being combined into a common output.

4. The optical device as set forth in claim 3, wherein the hologram element is substantially halved into the first and second regions along a dividing line that is parallel to a tangent of a track of the information recording medium when optically mapped onto the information recording medium so as to halve a reflected beam from the information recording medium in a diameter direction of the information recording medium along the dividing line.

5. The optical device as set forth in claim 4, wherein the common output from the third and fourth light receiving regions is a first detection output, the common output from the seventh and eighth light receiving regions is a second detection output, the first and second detection outputs are supplied to a first subtracter that finds a difference between the first and second detection outputs so that the difference is used to detect a tracking error signal with the use of a differential push-pull method employing the reflected sub-beams of the first wavelength; and the common output from the fifth and ninth light receiving regions is a third detection output, the common output from the sixth and tenth light receiving regions is a fourth detection output, the third and fourth detection outputs are supplied to a second subtracter that finds a difference between the third and fourth detection outputs so that the difference is used to detect a tracking error signal with the use of a three-beam method employing the reflected sub-beams of the second wavelength.

6. The optical device as set forth in claim 3, wherein the first wavelength is of a 650-nm band and the second wavelength is of a 780-nm band.

7. The optical device as set forth in claim 3, wherein one of a light source for emitting light of the first wavelength and a light source for emitting light of the second wavelength is integrally formed on a substrate of the light receiving element.

8. An optical pickup apparatus comprising:
the optical device as set forth in claim 7;
a laser source configured to emit light of the first wavelength; and
a diffraction grating configured to divide the light of the first wavelength emitted from the laser source into three beams,
the light source formed in the optical device being a laser source configured to emit light of the second wavelength, the optical device having a diffraction grating configured to divide the light of the second wavelength emitted from the laser source into three beams.

9. An optical pickup apparatus comprising:
the optical device as set forth in claim 7;
a laser source configured to emit light of the second wavelength; and
a diffraction grating configured to divide the light of the second wavelength emitted from the laser source into three beams,
the light source formed in the optical device being a laser source configured to emit light of the first wavelength, the optical device having a diffraction grating configured to divide the light of the first wavelength emitted from the laser source into three beams.

* * * * *